(12) United States Patent
Covell et al.

(10) Patent No.: US 8,639,796 B2
(45) Date of Patent: Jan. 28, 2014

(54) MONITORING THE PERFORMANCE OF A STREAMING MEDIA SERVER USING SERVER-SIDE AND CLIENT-SIDE MEASUREMENTS

(75) Inventors: Michele Covell, Palo Alto, CA (US); Beomjoo Seo, Culver City, CA (US); Sumit Roy, Menlo Park, CA (US); Mirjana Spasojevic, Palo Alto, CA (US); Leonidas Kontothanassis, Arlington, MA (US); Nina Bhatti, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2248 days.

(21) Appl. No.: 11/016,482

(22) Filed: Dec. 16, 2004

(65) Prior Publication Data
US 2006/0136578 A1    Jun. 22, 2006

(51) Int. Cl.
*G06F 15/173*    (2006.01)
(52) U.S. Cl.
USPC ............................ 709/224; 709/223; 709/231

(58) Field of Classification Search
USPC .......................................... 709/223–224, 231
See application file for complete search history.

(56) References Cited

U.S. PATENT DOCUMENTS

| | | | |
|---|---|---|---|
| 6,477,483 B1 * | 11/2002 | Scarlat et al. | 702/186 |
| 6,694,288 B2 * | 2/2004 | Smocha et al. | 702/186 |
| 6,754,701 B1 * | 6/2004 | Kessner | 709/219 |
| 6,868,434 B1 * | 3/2005 | Terranova et al. | 709/203 |
| 6,898,556 B2 * | 5/2005 | Smocha et al. | 702/186 |
| 6,898,564 B1 * | 5/2005 | Odhner et al. | 703/21 |
| 7,090,749 B2 * | 8/2006 | Flores et al. | 203/22 |
| 7,107,187 B1 * | 9/2006 | Saghier et al. | 702/186 |
| 7,313,635 B1 * | 12/2007 | Zavalkovsky | 709/248 |
| 7,594,025 B2 * | 9/2009 | Colville et al. | 709/233 |

* cited by examiner

*Primary Examiner* — Hussein A. Elchanti

(57) ABSTRACT

Methods and systems thereof for monitoring the performance of a streaming media server are described. Server-side measurements are performed with the server operating under a load. Client-side measurements are performed along with the server-side measurements. Data from the server-side measurements and data from the client-side measurements are aligned by time.

30 Claims, 3 Drawing Sheets

MONITORING THE PERFORMANCE OF A STREAMING MEDIA SERVER USING SERVER-SIDE AND CLIENT-SIDE MEASUREMENTS

TECHNICAL FIELD

Embodiments of the present invention relate to the field of streaming media.

BACKGROUND ART

The demand to stream multimedia (e.g., audio and video) data for live events and for file-based video-on-demand (VoD) is increasing as the content base and the available bandwidth increase. Contemporary video compression techniques mean that strict timing constraints are imposed on the delivery of the data to client devices. An inability to meet those timing constraints can result in reduced quality when the data is reconstructed and displayed.

The timely delivery of data can be affected by server performance (among other things). If, for example, a streaming server accepts too many client requests and cannot adequately handle the load, then the quality of service can degrade across all of the client sessions, or some subset of those sessions may fail completely. Thus, it is important to prevent the server from exceeding its saturation point—the point at which the load on the server exceeds the capability of the server to successfully serve all of its clients.

The size of a saturating load depends on the detailed characteristics of the various types of content being served to the various clients, such as the specific combination of live and file-based streams, their relative popularity, and their respective bit and packet rates, as well as the client count and the types of client requests. Conventional server-side measurements of server performance may not be sufficient for predicting when a server will be unable to maintain high quality service to its clients. For instance, the temporal variance observed in server-side measurements, such as load average measurements, can make shorter term measurements ineffective. However, longer term measurements that may reduce the temporal variance are inconsistent with the desire to quickly predict performance in the rapidly changing loading environment in which streaming servers operate.

Client-side measurements may also be ineffective in predicting server performance, because those measurements may be obscured due to the variance caused either by artificially smoothed transmission (e.g., packet smoothing) or by bursty transmission (e.g., packet blitting).

Also, information such as a list of client sessions loading the server may be hard to get due to privacy and security concerns. Even if such information is available, it is difficult to translate it into information that is useful for predicting server performance.

In summary, a method and/or system of evaluating and predicting the performance of streaming media servers, considering the variety of usage patterns and the dynamic nature of server workloads, would be valuable.

DISCLOSURE OF THE INVENTION

Embodiments of the present invention pertain to methods and systems thereof for monitoring the performance of a streaming media server. In one embodiment, server-side measurements are performed with the server operating under a load. Client-side measurements are performed along with the server-side measurements. Data from the server-side measurements and data from the client-side measurements are aligned.

BRIEF DESCRIPTION OF THE DRAWINGS

The accompanying drawings, which are incorporated in and form a part of this specification, illustrate embodiments of the invention and, together with the description, serve to explain the principles of the invention.

The drawings referred to in this description should not be understood as being drawn to scale except if specifically noted.

BEST MODE FOR CARRYING OUT THE INVENTION

Reference will now be made in detail to various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description of the present invention, numerous specific details are set forth in order to provide a thorough understanding of the present invention. In other instances, well-known methods, procedures, components, and circuits have not been described in detail as not to unnecessarily obscure aspects of the present invention.

The descriptions and examples provided herein are discussed in the context of multimedia data (also referred to herein as media data or media content). One example of multimedia data is video data accompanied by audio data; for example, a movie with soundtrack. However, media data can be video only, audio only, or both video and audio. In general, the present invention, in its various embodiments, is well-suited for use with speech-based data, audio-based data, image-based data, Web page-based data, graphic data and the like, and combinations thereof. Also, the present invention, in its various embodiments, is well-suited for use with data that may or may not be encoded (compressed) or transcoded.

Figure 1:
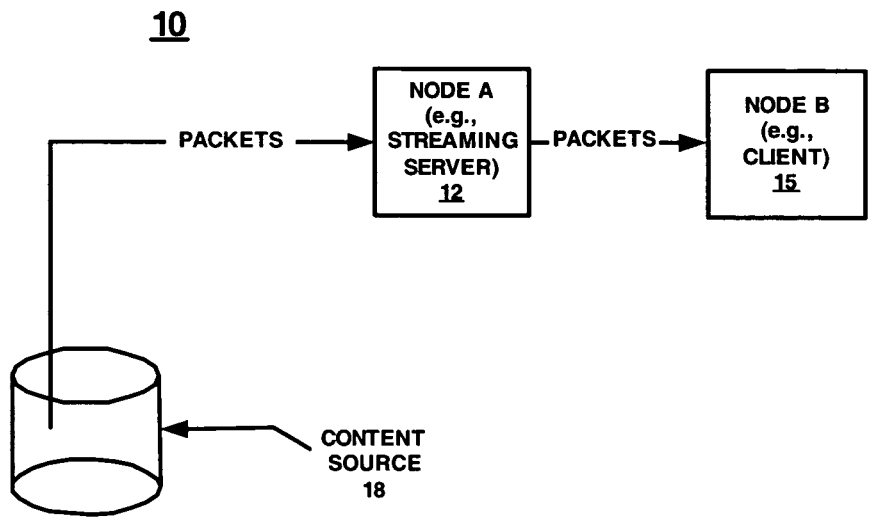
FIG. 1 is a representation of a network upon which embodiments of the present invention may be implemented.

FIG. 1 is a representation of a network 10 upon which embodiments of the present invention may be implemented. In the present embodiment, network 10 includes a content source 18 coupled to a first node A (e.g., server 12). In communication with server 12 are other nodes (e.g., node B) that may be client devices such as client 15. In one embodiment, server 12 is for streaming content (e.g., media data) from content source 18 to client 15. The content source 18, server 12 and client 15 may communicate via a wired connection, a wireless connection, or a combination thereof. The content may be live or recorded.

In general, content source 18 and server node 12 are types of devices that provide the capability to process and store data, and to send and receive data. Accordingly, content source 18 and server node 12 may be computer systems as well as other types of devices that may not be typically considered computer systems but have similar capabilities. Also, content source 18 may reside on server 12.

In practice, there may be any number of content sources, servers and clients. The route, or path, taken by the content as it travels from the content source 18 to the client node 15 may pass through any number of intervening nodes and interconnections between those nodes. Generally speaking, embodiments of the present invention pertain to the streaming of data packets from a sender to a receiver. Any of the nodes in network 10 may be considered to be a sender, and similarly any of the nodes in network 10 may be considered to be a receiver. The sender and receiver nodes may be adjacent nodes, or they may be separated by intervening nodes.

In one embodiment, aspects of the present invention are implemented as a computer-usable medium that has computer-readable program code embodied therein. A computer system can include, in general, a processor for processing information and instructions, random access (volatile) memory (RAM) for storing information and instructions, read-only (non-volatile) memory (ROM) for storing static information and instructions, a data storage device such as a magnetic or optical disk and disk drive for storing information and instructions, an optional user output device such as a display device (e.g., a monitor) for displaying information to the computer user, an optional user input device including alphanumeric and function keys (e.g., a keyboard) for communicating information and command selections to the processor, and an optional user input device such as a cursor control device (e.g., a mouse) for communicating user input information and command selections to the processor. The computer system may also include an input/output device for providing a physical communication link between the computer system and a network, using either a wired or a wireless communication interface.

Monitoring Server Performance Using Server and Client Measurements

Figure 2:
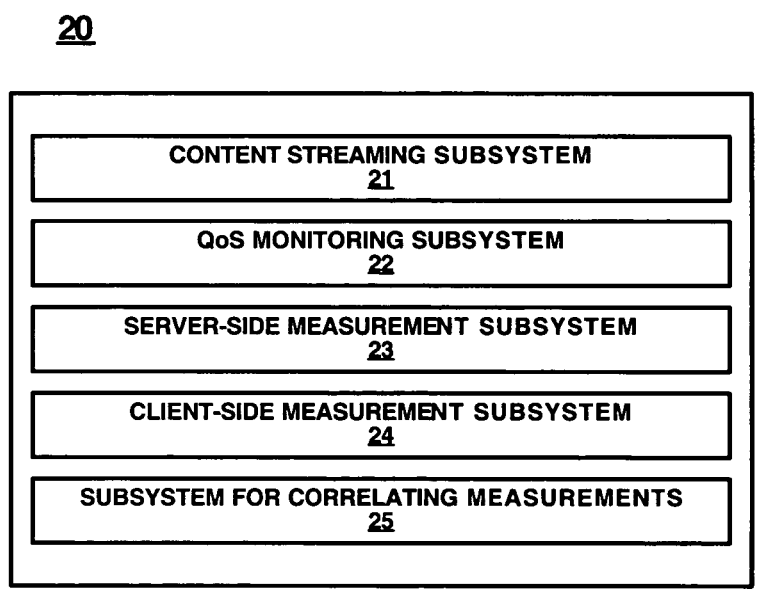
FIG. 2 is a block diagram of a system for calibrating a streaming media server according to one embodiment of the present invention.

FIG. 2 is a block diagram of a system 20 for calibrating a streaming media server according to one embodiment of the present invention. In the present embodiment, system 20 includes a content streaming subsystem 21, a quality-of-service (QoS) monitoring subsystem 22, a server-side measurement subsystem 23, a client-side measurement subsystem 24 and a subsystem 25 for aligning the server-side and client-side measurements versus time. System 20 can be implemented in a single software application or using multiple software modules, on a single device or distributed across multiple devices (e.g., computer systems). The functionality provided by the various subsystems of system 20 will become clear from the discussion to follow.

In overview, embodiments of the present invention pertain to the development of a model for predicting streaming media server performance. In one embodiment, the predictive model is developed by collecting server-side measurements and client-side measurements during a server calibration phase. In the calibration phase, the server is placed under a variety of different load conditions and probe client sessions are introduced at intervals. The measurements at the client and at the server are aligned versus time. Using the calibration measurements, a model that predicts server performance can be derived. The model can then be used to monitor and predict server performance with the server in place in a content delivery network.

In one embodiment, to calibrate the server 12 in system 10 of FIG. 1, the server is connected to some number of content source devices and some number of client devices. For calibration, the number of content source devices and the number of client devices may be less than the actual number of source devices and client devices that the server would typically be in communication with in a content delivery network. However, for calibration, a large number of content sources and client devices can be simulated. For instance, a single client device can simulate many virtual clients, and a single source can stream many independent streams. From the perspective of the server being calibrated, the number of client and source devices may not be known; it is the number of client sessions and content streams that is of interest.

In one embodiment, three axes or dimensions are used to describe the types of client loads placed on the server during calibration. For simplicity of discussion, the axes are labeled "repository," "popularity," and "bitrate."

"Repository" is analogous to "content source." Along the repository axis, in the present embodiment, the content can either be served from a locally stored file on the server, or it can be relayed as a live stream from a remote server or media encoder. Herein, locally stored file-based content is referred to as a VoD session, and the relayed live-stream content is referred to as a Live session.

In calibration, to avoid performance variation due to differences in the source content, multiple copies of the same material can be used for both Live and VoD sessions. In one embodiment, the content is encoded (compressed). For calibration, live content may be simulated as such. For example, for calibration, the live content can actually be stored on a content source device and then streamed to the server as though the content was live.

For each Live stream, the streaming server can suffer a loading overhead, whether or not that stream is used. To avoid this additional penalty during calibration, the number of independent Live streams can be matched to the number of Live streaming sessions; that is, in one embodiment, the number of Live streams received by the server is matched to the number of streams being relayed to clients by the server.

Along the popularity axis, an item of content can either be streamed to a single client or streamed to multiple clients. In general, for an item of Live content that is streamed to multiple clients, each client synchronously receives the ongoing transmission of a single source; for an item of VoD content that is streamed to multiple clients, each client asynchronously receives the source file, with each session having a starting point that is determined by the arrival time and rate of the client requests. At any given time, the clients receiving the item of VoD content are typically being served different parts of the same content. However, the popularity of the item of VoD content can affect server performance. For example, a popular item being streamed to many clients at the same time can be placed in the server's file-buffer cache, while an unpopular item that is only occasionally streamed may not be. An item in the file-buffer cache can be streamed without disk accesses (or with a reduced number of disk accesses), thereby improving server performance. Herein, content that is streamed in a single client session only is referred to as Unpopular, and content that is streamed from a single source in multiple client sessions (synchronously or asynchronously) is referred to as Popular.

Along the bitrate axis, the encoding bitrate of items of content is nominally a continuously varying dimension. However, in practice, there is a relatively small number of commonly used bitrates. For calibration, in one embodiment, source content with an encoded bitrate of 300 kilobits per second (kbps) is referred to herein as a High bitrate, and source content with an encoded bitrate of 78 kbps is referred to herein as a Low bitrate. These bitrates were selected because they correspond to the bitrates expected for mobile wireless streaming applications; however, the present invention is not so limited. Different bitrates can be used to calibrate a server depending on the access pattern expected for the server.

To minimize performance variation due to differences in content layout, VoD content can be stored on the streaming server disk just after reformatting to avoid file fragmentation. To ensure that each VoD Unpopular High request and each VoD Unpopular Low request retrieves content from the server disk instead of from the server file-buffer cache, multiple copies of the VoD content may be maintained on the server disk.

Thus, in one embodiment, each client session can be described using the aforementioned three axes or dimensions. If all of the client sessions requested from the server fall in the same three-axis category, the server workload is referred to herein as Pure. Otherwise, the server workload is referred to as Mixed. For calibration, in one embodiment, experiments are conducted in which Pure workloads are applied to the server. In such an embodiment, the measurements performed and information collected using Pure workload experiments can be extended to predict the effects of Mixed workloads. In another embodiment, Mixed workloads are included in the calibration experiments.

At the highest level, calibration can be viewed as consisting of essentially two phases. In a first phase, the server's saturation point is determined for each of the Pure workload types. The saturation point is, in general, the point at which the streaming server can no longer reliably supply high-quality service. Criteria that can be applied to more precisely identify a server's saturation point are described further below.

In a second phase, once the saturation point for a given Pure workload type is determined, experiments are performed and information collected for Pure workloads (of the same type as the given workload) below the saturation load. In one embodiment, out of interest in recognizing server saturation and in predicting the transition to a saturated state as the workload on the server is increased, experiments are performed and information collected in the range of 70 percent to 100 percent of the saturation workload. Specifically, in one embodiment, measurements are performed for Pure workloads that correspond to 70, 75, 80, 85, 90, 95 and 100 percent of the saturation workload; however, the present invention is not so limited.

To reach saturation, thousands of client sessions may be needed. As noted above, during calibration, in one embodiment multiple clients are simulated using a relatively small number of client devices. In such one embodiment, a client application is used that supports a large number of simultaneous streaming sessions without overloading the client devices. In one embodiment, the client application creates Real Time Protocol (RTP) over User Datagram Protocol (UDP) streaming sessions, using Real Time Streaming Protocol (RTSP) as the control protocol.

For each client session, measurements can be collected at the client device. For example, session-level statistics such as play failure, startup delay, total duration of data delivery, and number of bytes delivered can be recorded. A client can also record a trace of RTP/RTSP packets to provide packet arrival time, size and sequence number as well as the media decode time.

During calibration, each experimental period can be thought of as consisting of essentially three phases: ramp up, steady state, and termination. During ramp up, in one embodiment, client sessions are added to the server one at time to avoid startup failures due to transient effects. At steady state, the client sessions induce a particular size load on the server, as described above. At the steady state condition, measurements are collected from the server. The types of measurements are described further below. Measurement logging on the server can be made to a disk other than the disk on which content is stored, to avoid performance variation due to interfering disk accesses during measurement.

At steady state, in one embodiment, non-overlapping probe client sessions are sequentially launched. In one embodiment, for each probe client session, measurements are collected at the client device, while server-side measurements continue to be collected. The types of measurements are described further below.

In the present embodiment, the probe client sessions are designed to be low overhead. Thus, in one embodiment, probe client sessions use VoD Unpopular Low requests. VoD is selected because the selected file-based VoD content would be available and unchanging from one probe session to the next. Unpopular is selected because it may not be possible to determine what item of content is Popular at the time of each probe session and thus likely to be in the server's file-buffer cache. Instead, a particular item of content is selected only for the probe sessions. Low is selected to minimize the overhead induced by the probe session.

Figure 3:
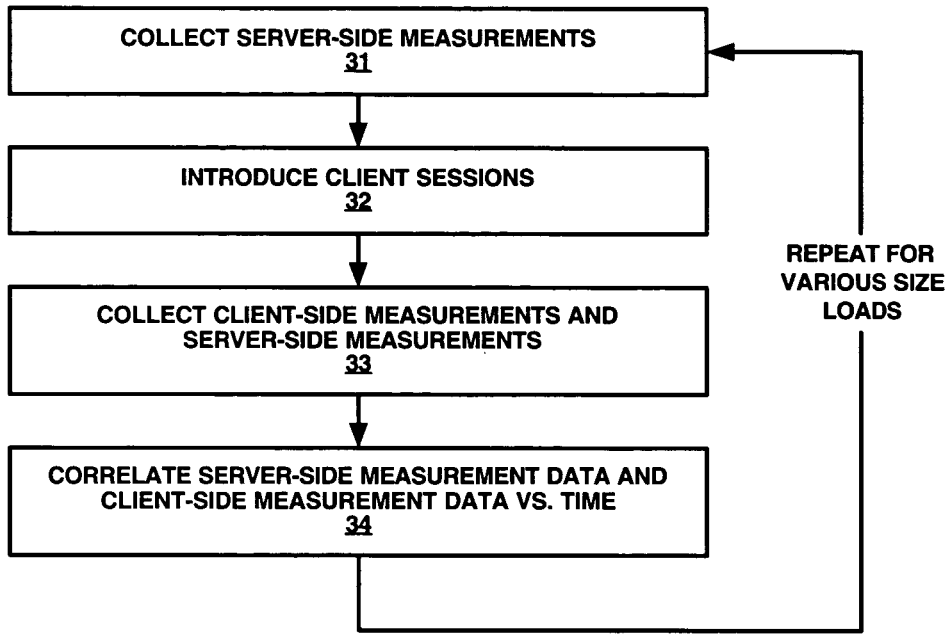
FIG. 3 is a flowchart of a method for calibrating a streaming media server according to one embodiment of the present invention.

FIG. 3 is a flowchart 30 of a method for calibrating a streaming media server according to one embodiment of the present invention. Although specific steps are disclosed in flowchart 30, such steps are exemplary. That is, embodiments of the present invention are well-suited to performing various other steps or variations of the steps recited in, flowchart 30. It is appreciated that the steps in flowchart 30 may be performed in an order different than presented, and that not all of the steps in flowchart 30 may be performed. All of, or a portion of, the methods described by flowchart 30 may be implemented using computer-readable and computer-executable instructions which reside, for example, in computer-usable media of a computer system.

In step 31, in the present embodiment, server resources are measured versus time with the server operating under a load. The server resources are measured at a server saturation load and at various sizes of load less than the saturation load. Also, the server resources are measured for different types of loads. In one embodiment, the server resources are measured for different types of Pure workloads, each Pure workload consisting of some combination of the three dimensions—Repository (e.g., content source), Popularity and Bitrate—described above.

In one embodiment, the server resources that are measured and recorded include, but are not limited to: interrupt rate; context-switching rate; time running non-kernel code; time running kernel code; idle time (including input/output wait time); load average over a prescribed time interval (e.g., one minute load average); incoming packet rate (e.g., incoming UDP packet rate); outgoing packet rate (e.g., outgoing UDP packet rate); disk-read-access rate; disk-sector-read rate; disk-write-access rate; and disk-sector-write rate. In addition, combined statistics can be derived from the recorded measurements, such as, but not limited to: the summed incoming and outgoing packet rates; the summed disk-read-access and disk-write-access rates; and the summed disk-sector-read and disk-sector-write rates.

In step 32, in the present embodiment, a request from a client (e.g., a probe client request) is introduced to the server, and the server replies to the request.

In step 33, in one embodiment, quantifiable characteristics of the server's reply are measured at the client versus time. In one such embodiment, the quantifiable characteristics that are measured and recorded include, but are not limited to: the amount of time between a time at which a command to the server is issued by the client and a time at which a packet associated with the command is received by the client; the rate at which data is received; and the packet-loss rate.

For example, in one embodiment, the probe clients use RTSP to initiate each streaming session. Accordingly, the probe client can obtain a description of the media content using a DESCRIBE command, indicate a desire to receive audio and video data using SETUP commands, and then start the audio and video streams with a PLAY command. Thus, two delay metrics can be determined. First, the delay between the first SETUP command and the arrival of the first RTP packet can be measured. Second, the delay between the PLAY request and the arrival of the first RTP packet can be measured. The DESCRIBE command is not used as the starting point for measuring delay because the server may have cached an earlier response to that command.

Each probe client can also record a trace of the probe client session. The traces can be used to determine, for example, bytes received per second and packet loss rate. Statistics can also be computed from the traces. For example, the packet arrival offset and the fine-grain variation in received bandwidth can be determined.

The packet arrival offset refers to the difference between each packet delivery time and its delivery deadline. The offset value is greater than zero when the packet is late and less than zero when the packet is early. In one embodiment, to obtain half-rectified packet arrival offsets, the negative offset values are replaced by zeroes, thereby discarding information about early packets other than their count. Also, late packets are often more problematic. In one embodiment, for fully-rectified packet arrival offsets, the negative offset values are replaced by their magnitude, so that early and late packets are treated equally. This latter metric may be included to help determine if a server is resorting to packet blitting (e.g., bursty transmission).

Fine-grain variations in the received bandwidth can be determined to help distinguish between packet smoothing and packet blitting, by measuring the uniformity of the bandwidth usage. Packet smoothing refers to the artificial smoothing of local variations in bandwidth by spreading out the delivery of packets that have the same media decode time stamp (e.g., for multi-packet video frames). When lightly loaded, a server may smooth packet delivery times, to avoid overloading the client's network input buffer, for example. In terms of the packet arrival offset metrics referred to above, packet smoothing can appear similar to packet blitting. Because packet smoothing is a desirable behavior (seen on lightly loaded servers) while packet blitting is an undesirable behavior (seen on heavily loaded servers), the use of fine-grain variations in received bandwidth may be helpful in distinguishing between packet smoothing and packet blitting.

In step 34 of FIG. 3, in one embodiment, the usage of the server resources and the values of the quantifiable characteristics are aligned versus time. In one embodiment, server-side measurements are recorded once per second. The once-per-session probe client delay metrics mentioned above can be translated into once-per-second values by replicating them. The packet arrival offset values mentioned above can be translated into once-per-second values using one-second window averages, medians, maxima and minima. Measurement of the fine-grain variations in received bandwidth can also use a one-second window median, minimum and maximum from the ratio between the bandwidth received by the probe client during a sliding 100 millisecond period and the bandwidth received by the probe client during the full one-second window.

In the present embodiment, a once-per-second measurement vector is derived that includes the measured values collected during that one-second interval and also includes the outputs from 60-second order filters applied to the measured values. In one embodiment, order filters provide local percentile measures. For example, for a 60-sample, 20th-percentile order filter, the order filter collects the 60 previous input values, sorts them from largest (100th percentile) to smallest (0th percentile), and then outputs the 12th smallest value (the 20th percentile). Thus, for example, a running median over a local time window is a 50th percentile order filter. In the present embodiment, multiple order filters are used instead of local means and local standard deviations because they provide statistical measures of a small-sample population that are less prone to distortion by the outliers within the population. This is an important consideration when trend and range estimates are needed with low latency.

In one embodiment, once-per-second measurement vectors are derived that include the measured values collected during that one-second interval and the outputs from 60-second order filters for the 0th, 5th, 25th, 50th, 75th, 95th and 100th percentiles; however, the present invention is not so limited. As noted above, measurements can be collected from both the streaming server and at the client devices (from the probe client sessions).

Using the information collected during server calibration, a predictive model can be derived. In one embodiment, a "labeled training data" approach is used. Such an approach utilizes both the calibration information described above, as well as label data. In one embodiment, normalized client load (client count) is used for the label data. In such an embodiment, the number of client sessions that corresponds to the saturation load (for a particular Pure load type) is counted during calibration. The normalized client load (x) can then be expressed as $x=[\ldots c_{ijk}/S_{ijk} \ldots]$, where $c=[\ldots c_{ijk}/\ldots]$ is the vector of client counts for each Pure workload type (ijk) and $S_{ijk}$ is the saturating client count for that workload type (the client count that corresponds to the saturating load).

Significantly, according to one embodiment of the present invention, the client count is not used other than during calibration, or for other than for Pure workloads. In practice (that is, for a server operating in a content delivery network), client counts can be difficult to obtain. Even if known, such information may be difficult to translate into media characteristics. Furthermore, the determination of relative content popularity and the gradation between various bit and packet rates may be non-obvious and non-stationary.

Identifying Failure of a Server to Satisfy Quality-of-Service Criteria

As described above, calibration can be viewed as consisting of essentially two phases. In a first phase, the server's saturation point can be determined for each of the Pure workload types, and in a second phase, experiments can be performed and information collected for Pure workloads (of the same type as the given workload) below the saturation load.

As used herein, the saturation point is, in general, the point at which the streaming server can no longer reliably supply high-quality service. Significantly, according to one embodiment of the present invention, clients that actually playback the data are not set up in order to determine whether the server has reached saturation. Instead, session-level data from the probe clients can be used to that end.

In one embodiment, to identify if and when the streaming server has reached its saturation point, a number of quality-of-service (QoS) criteria are defined. In such an embodiment, failure to satisfy any one of the criteria at any time during a calibration experiment indicates that the server has reached its saturation point for that experiment. For determining the saturation point, in one embodiment, each experimental epoch includes five 20-minute measurement sets at the presumed saturation point, in order to ensure reproducible and consistent definition of the server state; however, the present invention is not so limited.

QoS criteria applied according to one embodiment of the present invention are presented below. It is understood that QoS criteria other than those presented below may be used.

According to one of the QoS criteria (referred to as a play-request failure), if any loading client or probing client request fails to establish a streaming session, then the server is considered saturated. According to a second QoS criterion (referred to as a duration violation), if the actual duration of any client session is outside a specified time span (e.g., less than 97 percent or greater than 103 percent of the requested duration), then there is a failure of the server to provide the data delivery timing to support smooth, uninterrupted streaming without risking client buffer overflow or underflow.

According to a third QoS criterion (referred to as a size violation), if the number of bytes received by any loading client or probe client is outside a specified range (e.g., less than 97 percent of the expected data from the request source content), then a failure at the server is identified.

According to a fourth QoS criterion (referred to as a rebuffering violation), if the amount of time that a probe client spends waiting during delays (e.g., startup delays and midstream data rebuffering delays) is outside a specified range (e.g., more than three percent of the total play time for the probe client session), then a failure of the server to provide quality streaming is identified. In one embodiment, a rebuffering event penalty of two seconds is used for each midstream buffer violation, to account for excessively long startup delays and to also avoid frequent midstream rebuffering events.

In one embodiment, for calibration experiments, a refined definition of rebuffering events is applied. In general, as server workload is increased, packet transmission can become increasingly bursty. The timing of bursts may be such that on occasion one or two packets are delayed beyond their delivery deadline, resulting in rebuffering violations even though the server was not saturated. By recategorizing the late packets as lost packets, the rebuffering violations can be avoided without inducing a size violation (the third QoS criterion mentioned above). Therefore, in one embodiment, in applying the rebuffering QoS criterion, if the amount of sequential late-arriving data is less than a specified threshold (e.g., if the sequential late-arriving data is less than three percent of the previously received data), then that sequential late-arriving data is categorized as missing and the rebuffering penalty is not imposed. Otherwise, the whole sequence of late-arriving data is marked as a rebuffering event and the rebuffering event penalty is imposed.

Figure 4:
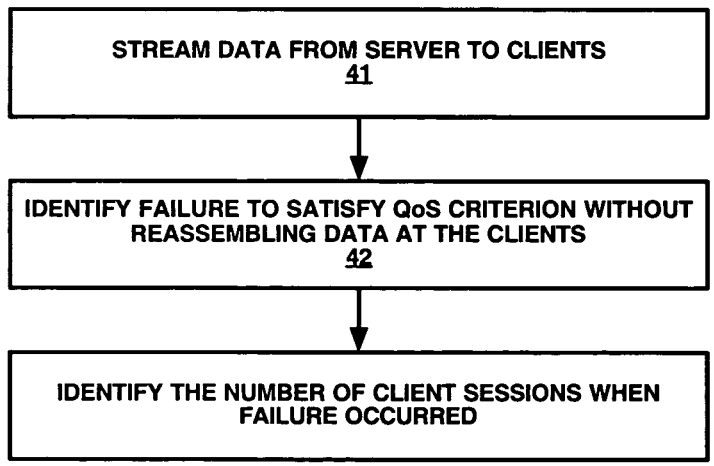
FIG. 4 is a flowchart of a method for monitoring the performance of a streaming media server according to one embodiment of the present invention.

FIG. 4 is a flowchart 40 of a method for monitoring the performance of a streaming media server according to one embodiment of the present invention. Although specific steps are disclosed in flowchart 40, such steps are exemplary. That is, embodiments of the present invention are well-suited to performing various other steps or variations of the steps recited in flowchart 40. It is appreciated that the steps in flowchart 40 may be performed in an order different than presented, and that not all of the steps in flowchart 40 may be performed. All of, or a portion of, the methods described by flowchart 40 may be implemented using computer-readable and computer-executable instructions which reside, for example, in computer-usable media of a computer system.

In step 41, in one embodiment, data is streamed from the server to a number of clients. In step 42, in one embodiment, a failure of the server to satisfy a quality-of-service criterion during the streaming is identified without assembling (reconstructing, or playback of) the data at the clients. The failure to satisfy a quality-of-service criterion is used herein to identify that the server has reached its saturation point.

In step 43, in one embodiment, the number of server-to-client streaming sessions corresponding to the failure of the server to satisfy the quality-of-service criterion is counted. This count serves as "ground-truth" data for calibration, as described above.

As an advantage of the above approach, the server can be identified as reaching its saturation point without setting up real clients (that is, by instead using virtual clients), because full display of the video data is not required in order to determine whether the server is capable of quality streaming. In other words, video quality at the clients can be measured indirectly, without observing an actual video display at each of the clients.

Models for Monitoring Streaming Server Performance

In overview, according to embodiments of the present invention, a streaming server is characterized as using a set of composite resources. In one embodiment, using distinct (e.g., Pure) client workloads during calibration, a composite resource usage model (a measurement-to-resource usage model) is derived. The composite resource usage model can be used with server-side and client-side measurements to estimate server resource consumption. Also, a model (a client-to-usage model) of the additional usage that is expected to be induced on the server by each additional client for each workload type is derived.

In one embodiment, as described above, server-side measurements are collected for each calibration experiment run for a Pure workload that is less than or equal to the saturation workload; however, as noted above, a Mixed workload can also be used. In one embodiment, the server-side measurements are annotated (time-aligned) with client-side measurements.

Figure 5:
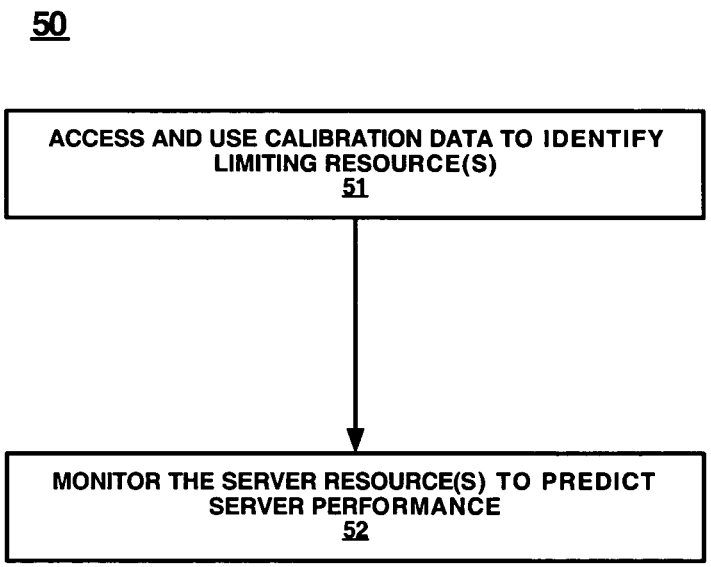
FIG. 5 is a flowchart of a method for using calibration information to predict the performance of a streaming media server according to one embodiment of the present invention.

FIG. 5 is a flowchart 50 of a method for using calibration information to predict the performance of a streaming media server according to one embodiment of the present invention. Although specific steps are disclosed in flowchart 50, such steps are exemplary. That is, embodiments of the present invention are well-suited to performing various other steps or variations of the steps recited in flowchart 50. It is appreciated that the steps in flowchart 50 may be performed in an order different than presented, and that not all of the steps in flowchart 50 may be performed. All of, or a portion of, the methods described by flowchart 50 may be implemented using computer-readable and computer-executable instructions which reside, for example, in computer-usable media of a computer system.

In step 51, in one embodiment, calibration data for the server is used to identify a server resource that reaches its respective limit before other server resources reach their respective limits as loads on the server are increased. In step 52, in one embodiment, the server resource is monitored to determine whether the server is approaching the saturation load with the server in service in a content delivery network.

More specifically, in one embodiment, for each of the eight types of client loads (corresponding to the eight possible combinations of the repository, popularity and bitrate dimensions described above), a nominally distinct saturating resource direction is identified. At saturation, each Pure client workload will use 100 percent of the resource direction on which it saturates. Each Pure client workload can also use between zero and 100 percent of the other resource directions at saturation.

In one embodiment, the usage of a resource is separately constrained both to be an affine function of the measurement vector and to be an affine function of the size of the workload. The solution can be found using projection-onto-convex sets. In the measurement-to-resource domain, the solution can be found using robust total least squares under inequality and vector-norm constraints. The inequality constraints on the robust total least squares include a constraint for non-negative, non-oversaturating resource usage at the same time as finding the measurement-to-resource models. The model for client-to-resource usage can then be refined in an alternate projection step, using the resource usage estimates derived from the measurements and the most recent measurement-to-resource model along with the client workloads. Before generating the client-to-resource usage model, in one embodiment, resource usage estimates are adjusted to the correct range (0 to $c_{ijk}/S_{ijk}$) and then total least squares is used. After completing this process for the given number of resource directions, consideration is given to lowering the number of resource directions by merging resources that are similar in direction. Similarity in direction can be measured using correlation coefficients on the resource usage across all types of clients. If the correlation coefficient in client usage across two resource dimensions is greater than 90 percent, then the two resource dimensions can be merged, in terms of which client types saturate on each resource dimension. The model estimation process may then be repeated using the smaller number of resource dimensions to completion.

Using the above approach, resource(s) can be identified that are reliable and unambiguous for predicting saturation across different types of client loads. Advantageously, this measurement-to-resource usage model is derived mathematically instead of relying on intuition.

The predictive models, determined using Pure workloads, can be validated using Mixed workloads only. The use of Pure workloads during calibration reduces the number of experiments. Using only Mixed workloads for validation reduces the chance that validation results will be overly optimistic. Training and testing on distinct types of workloads provides a realistic measure of the robustness of the derived predictive models.

The predictive models can be applied to the server with the server in service in a content delivery network. Real-time measurements from the streaming server and from a probe client (a client that is running on, for example, the same subnet as the server, or on the server itself, so that the client does not experience network effects) can be used with the measurement-to-resource model to determine the state of the server (e.g., whether the server is approaching its saturation point). Significantly, according to embodiments of the present invention, the real-time measurements are used without client counts. As mentioned above, client counts may not be available. Also, by using real-time measurements, accuracy is expected to increase, because the real-time measurements will include information about transient overload conditions that would not otherwise be captured. Thus, in lieu of using client counts, the server and probe client measurements described above are performed whenever it is necessary or desirable to estimate the status of a streaming server, using the measurement-to-resource usage models derived from the calibration data.

Thus, with a measurement-to-resource model and a client-to-usage model in place, server-side and client-side measurements with the server in place in a content delivery network can be used to estimate resource consumption. As a sample application, the models can be used for admission control. When an increase in the number of clients is proposed for a server, the expected resource consumption can be determined using:

$$R_{target} = Y_{resource} m + Y_{client} \Delta c;$$

where $Y_{resource}$ is the measurement-to-resource model, m is the vector of current measurements, $Y_{client}$ is the client-to-usage model, $\Delta c$ is the vector of the proposed additional client(s), and $R_{target}$ is the resultant resource usage vector.

With $Y_{resource} m$, the current resource use on the streaming server can be estimated. With $Y_{client} \Delta c$, that estimate can be adjusted according to the expected load from the client(s) being considered for admission. The additional client(s) can be admitted if $R_{target}$ does not map into the saturation region defined for the server.

As mentioned above, resource(s) can be identified that are reliable and unambiguous for predicting saturation across different types of client loads. Information about the resource(s) so identified can be provided to, for example, a centralized resource manager. If only these salient measures of server saturation are provided to the resource manager, the amount of information being transferred over the network, and the amount of information to be considered by the resource manager, are reduced, thus reducing the consumption of resources (e.g., bandwidth) and simplifying the work of the resource manager.

Clusters of servers can be managed in a similar manner. For instance, the additional predicted load can be determined for each server in the cluster. A new client request can then be assigned to the server for which, for example, the incremental increase in load is the smallest. Other criteria can be used to determine which server should admit the new client request.

In summary, embodiments of the present invention pertain to methods and systems for calibrating, monitoring and predicting server performance. An extensive calibration matrix, incorporating dimensions such as the type of content (live or locally stored), the popularity of the content, and the encoding bitrate of the content, is applied during calibration.

Embodiments of the present invention can be applied across different types of streaming servers and different types of streaming server hardware configurations. Because the server models described herein are based on calibration data that is used to select salient measures of server saturation, new software/hardware configurations can be modeled as well. Importantly, server effects can be distinguished from network effects, so that the performance of the server itself can be predicted with higher confidence.

According to embodiments of the present invention, prediction of saturation does not rely on categorized client counts being available from the server. Instead, the status of the server is actively monitored using server-side measurements. Client-side measurements are actively performed using a probe client, for example. Multiple client-side metrics are obtained, including metrics for startup delay, rebuffering, and packet loss. Measurements are carefully structured to be low latency. Use of time-localized models allows dynamics of in-service streaming workloads to be handled. Use of data-driven models allows transients in resource usage to be detected and responded to in a manner not permitted using client counts.

Embodiments of the present invention are thus described. While the present invention has been described in particular embodiments, it should be appreciated that the present invention should not be construed as limited by such embodiments, but rather construed according to the following claims.

What is claimed is:

1. A method of monitoring the performance of a streaming media server, said method comprising:
    measuring usage of a server resource versus time with said server operating under a streaming media load that is categorized using three dimensions comprising a repository axis, a popularity axis, and a bitrate axis, wherein said repository axis is an axis for types of content sources that are sources of streaming media loads and wherein said streaming media load is one of said streaming media loads;
    introducing to said server a request from a client that causes said server to reply to said client;
    measuring values of a quantifiable characteristic of said reply at said client versus time;
    aligning said usage of said server resource and said value of said quantifiable characteristic; and
    creating a model that predicts resource usage based on said alignment of said usage and said value.

2. The method of claim 1 further comprising determining a saturation load for said server, wherein at said saturation load said server fails to satisfy a predefined quality-of-service criterion.

3. The method of claim 2 performed for a plurality of different sizes of loads less than or equal to said saturation load.

4. The method of claim 2 further comprising identifying how many client sessions correspond to said saturation load.

5. The method of claim 1 wherein said load comprises a particular type of load, wherein a type of load is characterized according to how many server-to-client sessions are streaming an item of content, an expected encoding bitrate of said item of content, and whether said item of content is live or recorded.

6. The method of claim 5 further comprising:
    identifying a plurality of client loads that are categorized by discreet values of said repository axis, said popularity axis, and said bitrate axis; and
    identifying a respective saturation resource direction corresponding to each of said plurality of client loads.

7. The method of claim 1 wherein said server resource is selected from the group consisting of: interrupt rate; context-switching rate; time running non-kernel code; time running kernel code; idle time; load average over a prescribed time interval; incoming packet rate; outgoing packet rate; disk-read-access rate; disk-sector-read rate; disk-write-access rate; and disk-sector-write rate.

8. The method of claim 1 wherein said quantifiable characteristic is selected from the group consisting of: amount of time between a time at which a command to said server is issued by said client and a time at which a packet associated with said command is received by said client; rate at which data is received; and packetloss rate.

9. The method of claim 1 further comprising using an order filter to determine a statistical measure of said usage of said server resource and a statistical measure of said quantifiable characteristic.

10. The method of claim 1 performed during a server calibration phase conducted prior to placing said server in service in a content delivery network.

11. The method of claim 10 further comprising using said usage of said server resource and values of said quantifiable characteristic to model and predict performance of said server with said server in service.

12. A system for monitoring the performance of a streaming media server, said system comprising:
    a processor for executing instructions stored on a computer-readable storage medium, wherein said instructions are for;
        a subsystem for collecting data versus time from server-side measurements of said server, said server-side measurements taken at different server load conditions experienced by said server, wherein a streaming media workload that is used to generate said load conditions is categorized using three dimensions comprising a repository axis, a popularity axis, and a bitrate axis, wherein said repository axis is an axis for types of content sources that are sources of streaming media workloads and wherein said streaming media workload is one of said streaming media workloads:
        a subsystem for collecting data versus time from client-side measurements at a client that issues a request to said server;
        a subsystem for aligning said data from said client-side measurements and said data from said server-side measurement; and
        a subsystem for creating a model that predicts resource usage based on said alignment of said data from said client-side measurements and said data from said server-side measurement.

13. The system of claim 12 wherein said server load conditions include a saturation load condition, wherein at said saturation load condition said server fails to satisfy a predefined quality-of-service criterion.

14. The system of claim 13 wherein said server load conditions comprise different sizes of loads less than or equal to said saturation load condition.

15. The system of claim 12 wherein said server load conditions comprise different types of loads, wherein a type of load is characterized according to how many server-to-client sessions are streaming an item of content, an expected encoding Nitrate of said item of content, and whether said item of content is live or recorded.

16. The system of claim 12 wherein said server-side measurements are selected from the group consisting of: interrupt rate; context-switching rate; time running non-kernel code; time running kernel code; idle time; load average over a prescribed time interval; incoming packet rate; outgoing packet rate; disk-read-access rate; disk-sector-read rate; disk-write-access rate; and disk-sector-write rate.

17. The system of claim 12 wherein said client-side measurements are selected Thorn the group consisting of: amount of time between a time at which a command to said server is issued by said client and a time at which a packet associated with said command is received by said client; rate at which data is received; and packetloss rate.

18. The system of claim 12 wherein order filters are used to determine statistical measures of said data from said server-side measurements and said data from said client-side measurements.

19. The system of claim 12 wherein said client-side measurements and said server-side measurements are performed during a server calibration phase conducted prior to placing said server in service in a content delivery network.

20. The system of claim 19 wherein said data from said server-side measurements and said data from said client-side measurements are used to model and predict performance of said server with said server in service.

21. A computer-readable storage medium having computer readable code stored thereon for causing a device to perform a method of monitoring the performance of a streaming media server, said method comprising:
   collecting server-side metrics from said server, said server-side metrics quantifying resource usage by said server with said server streaming media to a plurality of clients, wherein said streamed media is generated using a workload that is categorized using three dimensions comprising a repository axis, a popularity axis, and a bitrate axis, wherein said repository axis is an axis for types of content sources that are sources of workloads and wherein said workload is one of said workloads;
   collecting client-side metrics from a client in communication with said server, said client-side metrics quantifying characteristics of said communication;
   aligning said server-side metrics and said client-side metrics; and
   creating a model that predicts resource usage based on said alignment of said server-side metrics and said client-side metrics.

22. The computer-readable storage medium of claim 21 wherein said computer-readable program code embodied therein causes said device to perform said method further comprising:
   determining a saturation load for said server, wherein at said saturation load said server fails to satisfy a predefined quality-of-service criterion; and
   collecting server-side metrics with said server operating at said saturation load.

23. The computer-readable storage medium of claim 22 wherein said collecting of server-side metrics and client-side metrics is performed for a plurality of different sizes of loads less than said saturation load.

24. The computer-readable storage medium of claim 22 wherein said computer-readable program code embodied therein causes said device to perform said method further comprising identifying how many client sessions correspond to said saturation load.

25. The computer-readable storage medium of claim 22 wherein said collecting of server-side metrics and client-side metrics is performed for a plurality of different types of loads, wherein a type of load is characterized according to how many server-to-client sessions are streaming an item of content, an expected encoding bitrate of said item of content, and whether said item of content is live or recorded, said method further comprising
   identifying a plurality of client loads that are categorized by discreet values of said repository axis, said popularity axis, and said bitrate axis; and
   identifying a respective saturation resource direction corresponding to each of said plurality of client loads.

26. The computer-readable storage medium of claim 22 wherein said server-side metrics are selected from the group consisting of: interrupt rate; context-switching rate; time running non-kernel code; time running kernel code; idle time; load average over a prescribed time interval; incoming packet rate; outgoing packet rate; disk-read-access rate; disk-sector-read rate; disk-write-access rate; and disk-sector-write rate.

27. The computer-readable storage medium of claim 22 wherein said client-side metrics are selected from the group consisting of: amount of time between a time at which a command to said server is issued by said client and a time at which a packet associated with said command is received by said client; rate at which data is received; and packet-loss rate.

28. The computer-readable storage medium of claim 22 wherein said computer-readable program code embodied therein causes said device to perform said method further comprising using order filters to determine statistical measures of said media from said server-side metrics and said media from said client-side metrics.

29. The computer-readable storage medium of claim 22 wherein said method is performed during a server calibration phase conducted prior to placing said server in service in a content delivery network.

30. The computer-readable storage medium of claim 29 wherein said server-side metrics and said client-side metrics are used to model and predict performance of said server with said server in service.

* * * * *

UNITED STATES PATENT AND TRADEMARK OFFICE
CERTIFICATE OF CORRECTION

PATENT NO. : 8,639,796 B2  Page 1 of 1
APPLICATION NO. : 11/016482
DATED : January 28, 2014
INVENTOR(S) : Michele Covell et al.

It is certified that error appears in the above-identified patent and that said Letters Patent is hereby corrected as shown below:

In the Claims:

In column 13, line 63, in Claim 8, delete "packetloss" and insert -- packet-loss --, therefor.

In column 14, line 45, in Claim 15, delete "Nitrate" and insert -- bitrate --, therefor.

In column 14, line 55, in Claim 17, delete "Thorn" and insert -- from --, therefor.

In column 14, line 59, in Claim 17, delete "packetloss" and insert -- packet-loss --, therefor.

Signed and Sealed this
Third Day of June, 2014

Michelle K. Lee
*Deputy Director of the United States Patent and Trademark Office*